(12) United States Patent
Nicholas

(10) Patent No.: US 7,442,311 B2
(45) Date of Patent: Oct. 28, 2008

(54) EMULSION AND EFFLUENT TREATMENT PROCESSES

(75) Inventor: Dolly Nicholas, Marabella (TT)

(73) Assignee: Hydrocarb (Trinadad) Limited, Fyzabad (TT)

( * ) Notice: Subject to any disclaimer, the term of this patent is extended or adjusted under 35 U.S.C. 154(b) by 297 days.

(21) Appl. No.: 10/505,281

(22) PCT Filed: Feb. 19, 2003

(86) PCT No.: PCT/IB03/00605

§ 371 (c)(1),
(2), (4) Date: Jan. 14, 2005

(87) PCT Pub. No.: WO03/070350

PCT Pub. Date: Aug. 28, 2003

(65) Prior Publication Data

US 2005/0119354 A1    Jun. 2, 2005

(30) Foreign Application Priority Data

Feb. 20, 2002  (TT) .................. TT/A/2002/00021
Mar. 5, 2002   (TT) .................. TT/A/2002/00032

(51) Int. Cl.
*B01D 17/05* (2006.01)

(52) U.S. Cl. .................. 210/708; 208/188; 210/709; 210/713; 210/719; 210/721; 210/727; 210/737

(58) Field of Classification Search .................. 210/708
See application file for complete search history.

(56) References Cited

U.S. PATENT DOCUMENTS

| | | | |
|---|---|---|---|
| 3,620,967 A | 11/1971 | Gulick | 208/179 |
| 3,687,845 A * | 8/1972 | Treat et al. | 210/734 |
| 3,756,959 A * | 9/1973 | Vitalis et al. | 516/154 |
| 3,986,953 A | 10/1976 | Beaucaire | 210/708 |
| 4,014,801 A * | 3/1977 | Fullinwider et al. | 507/277 |
| 4,122,009 A * | 10/1978 | Tao et al. | 210/708 |
| 4,961,858 A * | 10/1990 | Spei et al. | 210/708 |
| 5,120,428 A | 6/1992 | Ikura et al. | 208/188 |
| 5,192,448 A * | 3/1993 | Augustin et al. | 210/708 |
| 5,200,082 A * | 4/1993 | Olsen et al. | 210/667 |
| 5,269,906 A * | 12/1993 | Reynolds et al. | 208/13 |
| 5,744,045 A * | 4/1998 | Yuen | 210/719 |
| 5,753,125 A * | 5/1998 | Kreisler | 210/710 |
| 5,804,078 A | 9/1998 | Morrow et al. | 210/708 |
| 6,117,333 A | 9/2000 | Frankiewicz et al. | 210/705 |
| 6,214,236 B1 * | 4/2001 | Scalliet | 210/708 |
| 6,428,705 B1 * | 8/2002 | Allen et al. | 210/638 |
| 6,454,949 B1 * | 9/2002 | Sesay et al. | 210/709 |
| 6,482,327 B1 * | 11/2002 | Mori et al. | 210/695 |

* cited by examiner

Primary Examiner—Peter A. Hruskoci
(74) Attorney, Agent, or Firm—Nixon & Vanderhye P.C.

(57) ABSTRACT

An emulsion and affluent process which treats and breaks very tight emulsions and separates dissolved solids from associated fluids produced in industry, whereby solids and fluids are separated into clean interfacial phases thus providing an improved quality saleable product resulting in significant reductions in base sediments and water, and compliance with international saleable product and environmental effluent standards with a specific focus on biological oxygen demand and chemical oxygen demand levels for treated fluids.

11 Claims, 4 Drawing Sheets

*Effluent Treatment Process*

EMULSION AND EFFLUENT TREATMENT PROCESSES

This application is the US national phase of international application PCT/IB03/00605 filed 19 Feb. 2003, which designated the US and claims priority to TT Application No. TT/A/2002/00021 filed 20 Feb. 2002 and TT Application No. TT/A/2002/00032 filed 5 Mar. 2002. The entire contents of these applications are incorporated herein by reference.

RELATED APPLICATIONS

This application hereby claims priority on Trinidad & Tobago Patent Nos. TT/A/2002/00021 & TT/A/2002/00032 filed Feb. 20, 2002 and Mar. 5, 2002, respectively.

FIELD OF THE INVENTION

The instant invention relates to improved emulsion and effluent treatment processes and, more particularly, to an improved process for treating and breaking down tight emulsions, such as Slops, for a variety of industries using an oxidizing/reducing agent and a temperature change rather than a de-emulsifier. The invention also provides an improved effluent treatment process that also uses an oxidizing/reducing agent and a temperature change to remove dissolved solids from an aqueous phase and provide clean water that complies with international environmental discharge parameters.

BACKGROUND AND SUMMARY OF THE INVENTION

Presently, problems exist globally where, as a consequence of an industrial process, certain emulsions (e.g.,"slops") and effluent with dissolved solids ("the material") are produced which do not meet local and/or global saleable product and environmental effluent standards or environmentally acceptable effluent discharge substance parameters. Such problems result from, for example, petroleum and petrochemical extraction processes and by-products of production process treatment. Such problems can also arise in other industries, such as Energy, Manufacturing, Pharmaceutical, Agricultural, Food and Beverage, Meat, Poultry, Fish Processing, and Hotel and Tourism Industry, etc.

Globally, attempts have been made to break down and/or separate very tight emulsions into phases of quality saleable products (if possible) and environmentally friendly effluent. For example, attempts have been made to cause the interfacial separation of oil, sand and water into phases within the petroleum and petrochemical industries. Existing processes and treatment products, however, have not been able to treat and break down to any great extent tight emulsions and consequently result in tighter emulsions or new environmental effluent problems. For example, in an attempt to achieve the necessary interfacial separation, prior art systems often increase rather than decrease the biological oxygen demand and chemical oxygen demand levels.

Thus, improved emulsion and effluent treatment processes are needed that overcome the problems encountered with known processes and effectively treat tight emulsions and effluent in a cost effective and advantageous manner. The instant invention addresses this need by providing improved emulsion and effluent treatment processes that ensure adherence to International Environmental Management standards for all industries, including standards set by the Environmental Protection Agency (EPA), United Nations Environment Programme (UNEP) and Environmental Management Authority (EMA), and with particular focus on Biological and Chemical Oxygen Demand (BOD & COD) requirements.

The instant invention treats and breaks very tight emulsions (Slops) for all industries through the use of hydrophobic and hydrophilic chemicals which reduce interfacial tension, increase fluid absorption and produce insitu gas/gases during use and, as a consequence, give rise to clean interfacial separation. In accordance with the invention, the chemical is not a de-emulsifier or a surfactant or any combination thereof. Instead, the chemical is an oxidizing/reducing agent and may be in the form of a solid, liquid or gas (or combination thereof). The process of the invention also removes dissolved solids from the aqueous phase of the treated associated fluids through reaction and/or chained scission, rendering the water effluent discharge parameter levels compliant with International Environmental Effluent Standards.

The invention is not limited to any specific chemicals. However, the instant inventor has determined that chemicals available from Hydrocarb Trinidad Limited under the tradenames HCL2003, HPC2003, HGC2003, and HSC2003 achieve the desired results when used in accordance with the invention. HCL2003 corresponds to CAS No. 7664-93-9 (sulfuric acid), HPC 2003 corresponds to CAS No. 7778-54-3 (calcium hypochlorite), HGC2003 corresponds to CAS No. 7782-50-5 (Chlorine), and HSC2003 corresponds to CAS No. 64742638 & 5989-27-5 (d-Limonene).

The process of the instant invention is quite economical and practical for purposes of the industry, and converts the emulsions into quality saleable products with significant reductions in the biological oxygen demand and chemical oxygen demand levels for the aqueous phase to water effluent discharge parameter levels compliant with the International Environmental Effluent Standards. Successful treatment results are based on the reduction and/or removal of the dissolved solids to a great extent in combination with the interfacial separation of the various phases.

The instant invention provides a universal process for treating and breaking down tight emulsified slops and/or the removal of dissolved solids derived from the waste extraction or discharge phase of an industrial production process which is capable of meeting international saleable product and environmental standards.

The hydrophobic and hydrophilic chemicals and temperature change cause a reduction in interfacial tension, increased fluid absorption and production of insitu gas/gases during use. As a consequence of these chemical reactions and/or chained scission, the cuts from the emulsion are rendered clean, categorized as the quality saleable product phase (as exemplified by oil with significant reductions in base sediments and water), solid phase (as exemplified by sand and/or base sediments) and an aqueous phase (as exemplified by water with significant reductions in dissolved solids).

Conversion of the material from a soluble to an insoluble state and separation of the non-dissolved solids (residue) from the aqueous phase renders the residue compliant with all local and/or global environmental standards for release of the waste substances into the environment. The removed residue can then be recycled into the environment and is not a waste as an environmentally unsound material which needs disposal. No new environmental problem is created by virtue of the dissolved solids being removed which thereby closes the environmental loop.

Additionally, the treated fluids from the aqueous phase complies with the international environmental effluent standards for biological oxygen demand and chemical oxygen demand requirements, in addition to the standard set for dissolved oxygen as well as total petroleum hydrocarbons, total suspended solids, hydrogen ion (pH), sulphide, and the other water pollutant substance parameters, including the International Environmental Effluent Discharge Substance Parameters.

In accordance with the invention, the process of reaction uses either a solid as exemplified by ice, a liquid as exemplified by water and/or a gas as exemplified by steam (or any suitable combination thereof) which results in chained scission and/or reaction in the breaking up of tight emulsions and removal of dissolved solids. This process achieves separation in clean phases and allows for the optimal removal of quality saleable products from the slops and may even achieve one hundred percent (100%) recovery in some applications.

Thus, a primary object of the present invention in a preferred embodiment is to provide an emulsion and effluent treatment process which is practical and economical and which: 1) treats and breaks any type of emulsion (slops) giving rise to clean (oil/water/sand) interfacial separation; 2) meets saleable crude oil quality standards consistent with the petroleum industry's acceptable BS&W range; 3) significantly reduces the amount of emulsified water by approximately 100% and will not allow the treated fluids to re-emulsify; 4) significantly reduces the total petroleum hydrocarbons, biological oxygen demand and chemical oxygen demand levels for the treated fluids in the aqueous phase compliant with International Environmental Effluent Standards; 5) adds value to downstream operations by enhancing waste water quality at the discharge point; and 6) improves oil content in storage tanks by significantly reducing the base, sediments and water.

In accordance with the instant invention, a two phased process is used. Phase one (emulsion treatment) treats and breaks very tight emulsions, while phase two (effluent treatment) ensures compliance with the international environmental effluent discharge parameters. The two phases can function independent of each other depending on the particular needs or desires for a particular application.

In accordance with the emulsion treatment process the treating chemical utilized (exemplified by a solid/liquid/gas) is absorbed by the emulsion resulting in a reduction of the interfacial tension which, for example, strips oil from sand and drops off water. The process further causes chain scission of the oil molecules causing its molecular weight to change thereby enhancing the final viscosity. This is all accomplished with a change in temperature. The chemical utilized is not a de-emulsifier/emulsifier/surfactant. Instead, the chemical is an oxidizing/reducing agent.

In a preferred embodiment, the emulsion treatment process results in the breaking down of tight emulsion from slops produced as a consequence of the extraction of petroleum/petrochemicals and by-products of the production process treatment. The non-saleable slops are now rendered an improved quality saleable product with clean cuts. In addition, the aqueous phase created as a consequence of separation has its biological oxygen demand and chemical oxygen demand levels significantly reduced. What is released into the environment after the application of the emulsion treatment process may meet international environmental effluent standards. Thus, the process is economic and environmentally friendly.

In accordance with the effluent treatment process, the chemical utilized (exemplified by solid/liquid/gas) converts and complexes with the soluble salts (or other dissolved solid) and precipitates them so that the dissolved solids are removed as solids. This is also accomplished through the use of an oxidizing/reducing agent and a change in temperature.

In a preferred embodiment, the effluent treatment process results in the removal of dissolved solids from materials produced as a consequence of the extraction of petroleum and petrochemicals and by-products of production process treatment. The process uses chemical reaction and/or chained scission in the removal of the dissolved solids. The dissolved solids in the material which were once soluble are rendered insoluble and this non dissolved solid is then removed. The material created as a consequence of the extraction is treated and is able to meet international environmental standards. The non-dissolved solid can then be recycled into the environment thereby closing the environmental loop. The treated residue can then also be released into the environment.

In accordance with one aspect of the invention, a method of treating and breaking down tight emulsions is provided that includes: injecting the emulsion with an oxidizing/reducing agent; changing the temperature of the emulsion; allowing interfacial separation of the emulsion; and outputting a saleable product phase, a solid phase and an aqueous phase. The emulsion is preferably tested prior to the injection to determine the desired quantity of the oxidizing/reducing agent, treatment time and treatment temperature. The interfacial separation occurs by maintaining the changed temperature of the emulsion for the determined treatment time. The injection and the temperature change cause a reduction in interfacial tension and chain scission. If necessary, a solubilizer may be injected into the emulsion after breakage to enhance the saleable product and solid phase.

The tight emulsion may be slops produced during production of petroleum and petrochemicals and/or by-products of the production process treatment. In one application, the saleable product phase is oil with significant reduction in base sediments and water, the solid phase is sand and/or base sediments, and the aqueous phase is water with significant reductions in dissolved solids. The oxidizing/reducing agent includes hydrophobic chemicals, hydrophilic chemicals or a combination thereof. The oxidizing/reducing agent is absorbed into the emulsion and, for example, strips the oil molecules off sand and water, and becomes part of the aqueous phase. The aqueous phase has a significant reduction in biological oxygen demand and chemical oxygen demand levels. The aqueous phase can then be further treated using an oxidizing/reducing agent and a temperature change to convert soluble material to an insoluble state and precipitate dissolved solids. Filtration may be used to extract the dissolved solids, thereby leaving a residue and a clean effluent. The clean effluent can be water that complies with international environmental effluent discharge substance parameters. The residue may be recycled into the environment.

In accordance with another aspect of the invention, a method of treating an effluent is provided, which includes: injecting the effluent with an oxidizing/reducing agent; changing the temperature of the effluent; converting soluble material to an insoluble state and precipitating the dissolved solids; removing the dissolved solids from the effluent, thereby leaving a residue and a clean effluent. Preferably, the effluent is tested prior to the injection to determine the desired quantity of the oxidizing/reducing agent, treatment time and treatment temperature. The injection and the temperature change cause a chemical reaction and/or chain scission which promotes removal of the dissolved solids. The clean effluent is preferably water that complies with international environmental effluent discharge substance parameters. The residue can then be recycled into the environment.

DETAILED DESCRIPTION OF THE DRAWINGS

Figure 1:
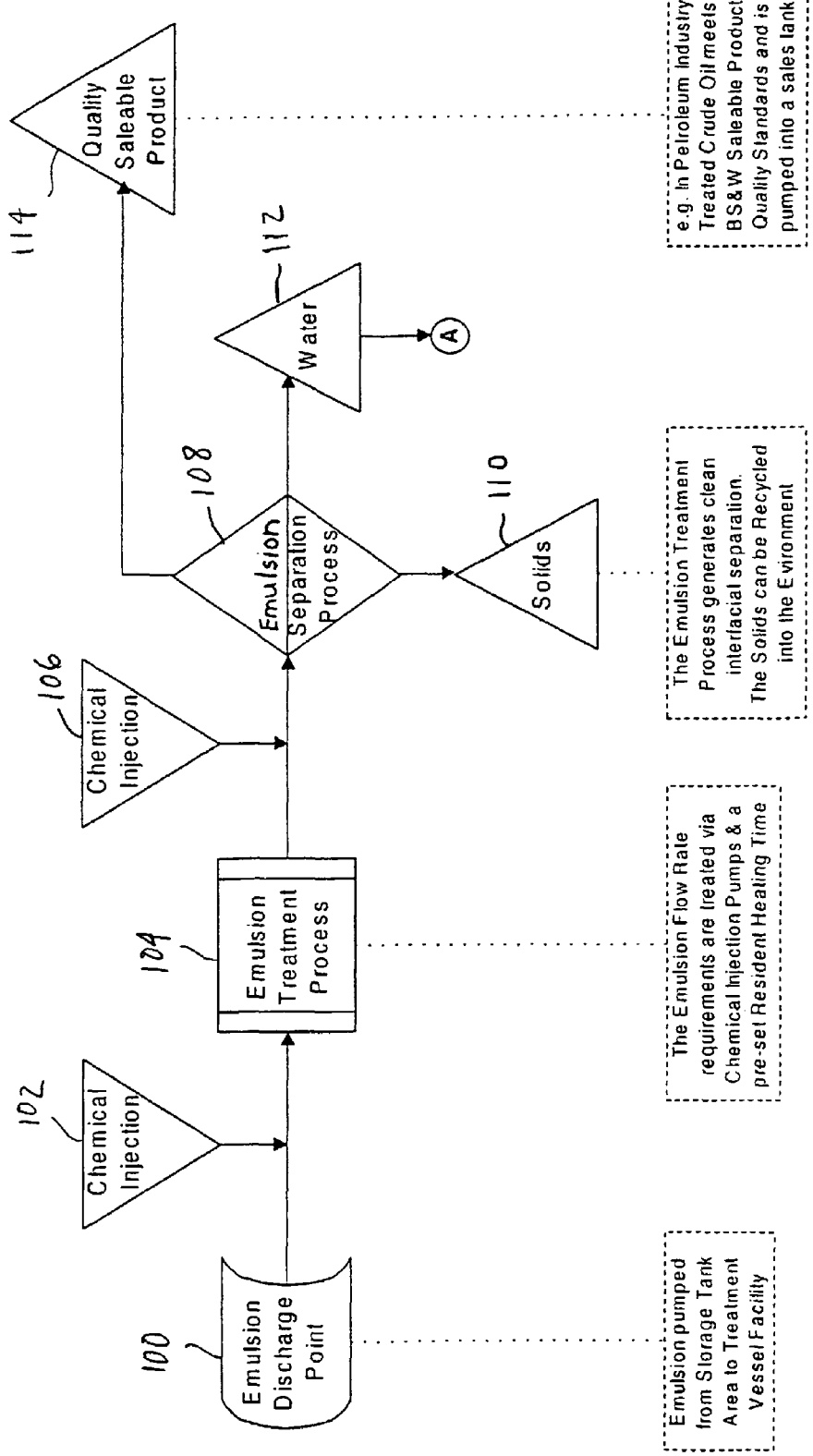
FIG. 1 is a flow diagram of the main stages of the emulsion treatment process, in accordance with a preferred embodiment of the instant invention.

A description of the preferred embodiments will now be described with reference to the figures. FIG. 1 a flow diagram of the main stages of the emulsion treatment process, in accordance with a preferred embodiment of the instant invention. In the first stage 100, the stored or online emulsion to be treated is pumped from either the storage tank area or online terminal process facility to an emulsion treatment vessel facility. This will enable realization of the market value of all converted emulsion, as well as create tank storage space.

In the next stage 102, the chemical(s) is/(are) injected based on tests which were performed on the emulsion and the analysis of the emulsion composite profile which determined the choice of hydrophobic/hydrophilic/oxidizing/reducing chemicals to be used in the treatment process, as well as chemical injection amounts that should be utilized and treatment temperature. The chemical(s) is/(are) injected into the emulsion stream based on the required treatment rates and emulsion flow rates.

In the next stage 104, the temperature of the emulsion is changed to the treatment temperature. This temperature could be any temperature depending on the particular application in which the invention is employed. However, an exemplary temperature for embodiments discussed herein may be 30 degrees Celsius. This temperature change acts as a catalyst to the interfacial separation process. The temperature change is dependent on the emulsion type. Once the desired temperature is achieved, it must be maintained for the treatment time of the specific emulsion. This process causes a reduced interfacial tension and chained scission which result in clean (e.g., oil/water/solid) interfacial separation.

In the next stage 106, a solubilizer may also be injected into the emulsion after breakage to enhance the saleable product and solid phase. The solubilizer may be used when, for example, thick viscous crudes are involved. This stage is optional and can be omitted when, for example, light crudes are involved. In any event, the solubilizer is only added after breaking of the emulsion.

In the next stage 108, resident time is required for clean interfacial separation, categorized as the quality saleable product phase (as exemplified by oil with significant reductions in base sediments and water), solid phase (as exemplified by sand and/or base sediments) and an aqueous phase (as exemplified by water with significant reductions in dissolved solids). This provides a quality saleable product 114 with an enhanced API gravity which also meets the industry's Base Sediments & Water (BS&W) standards, environmentally friendly recyclable solids 110, and an aqueous phase 112 with improve water quality.

Figure 2:
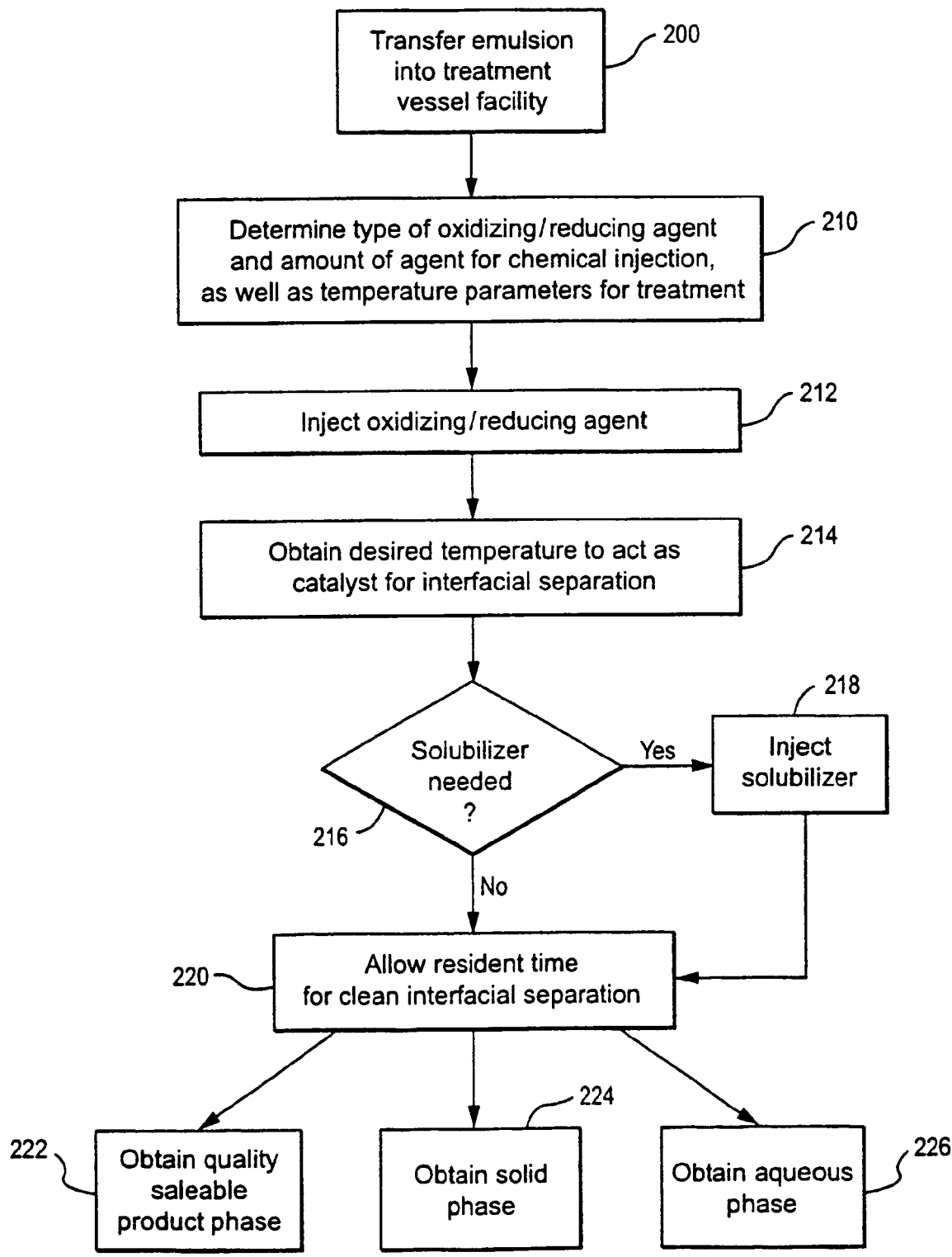
FIG. 2 is a flow chart showing the main steps involved in the emulsion treatment process of FIG. 1.

FIG. 2 shows a flow chart of the main steps involved in the emulsion treatment process described above in connection with FIG. 1. As described above, the first step 200 is to transfer the emulsion to be treated into the treatment vessel facility. The next step 210 is to conduct tests on the emulsion to determine the exact type of oxidizing/reducing agent to be used for the emulsion, as well as temperature parameters for the treatment. In the next step 212, the oxidizing/reducing agent is injected into the emulsion. Then, in step 214, the emulsion is brought to the desired temperature to act as a catalyst for the interfacial separation. Then, if a solubilizer is needed (step 216) to enhance the saleable product and solid phase, a solubilizer is injected into the emulsion after breakage (step 218).

Next, the process is given time for clean interfacial separation (step 220). Once step 220 is complete, a quality saleable product phase is obtained (step 222), a solid phase is obtained (step 224) and an aqueous phase is obtained (step 226).

As described above, the invention treats and breaks very tight emulsions (Slops) for all industries through the use of hydrophobic/hydrophilic/oxidizing/reducing agent which reduce interfacial tension, increase fluid absorption and produce insitu gas/gases during use and, as a consequence, give rise to clean interfacial separation. In accordance with the invention, the oxidizing/reducing agent is not a de-emulsifier or a surfactant or any combination thereof. The oxidizing/reducing agent may be in the form of a solid, liquid or gas (or combination thereof). The invention is not limited to any specific chemical(s) for the oxidizing/reducing agent. However, the instant inventor has determined that chemicals available from Hydrocarb Trinidad Limited under the tradenames HLC2003, HPC2003, HGC2003 and HSC2003 achieve the desired results when used in accordance with the invention. The ratios and/or blends of these chemicals can also vary depending on the particular application. In the petroleum and petrochemical environment, the oxidizing/reducing agent is designed to be absorbed into the emulsion and strip the oil molecules off the sand and water. The chemical then stays with the water phase and is environmentally sound.

Although the ratios and/or blends of the above listed chemicals can vary depending on a particular application, one illustrative non-limiting exemplary composition of HSC2003 includes Hydrotreated Distillate in the range of 45%-50% and Terpene Hydrocarbons in the range of 45%-50%, as noted on a Material Data Sheet available from Hydrocarb Trinidad, Ltd.

The oxidizing/reducing agent and temperature change cause a reduction in interfacial tension, increased fluid absorption and production of insitu gas/gases during use. As a consequence of these chemical reactions and/or chained scission, the cuts from the emulsion are rendered clean, categorized as the quality saleable product phase (as exemplified by oil with significant reductions in base sediments and water), solid phase (as exemplified by sand and/or base sediments) and an aqueous phase (as exemplified by water with significant reductions in dissolved solids).

In accordance with the emulsion treatment process the treating chemical utilized (exemplified by a solid/liquid/gas) is absorbed by the emulsion resulting in a reduction of the interfacial tension which, for example, strips oil from sand and drops off water. The process further causes chain scission of the oil molecules causing its molecular weight to change thereby enhancing the final viscosity. This is all accomplished with a change in temperature. Again, the chemical utilized is not a de-emulsifier/emulsifier/surfactant; Instead, the chemical is an oxidizing/reducing agent.

In a preferred embodiment, the emulsion treatment process results in the breaking down of tight emulsion from slops produced as a consequence of the extraction of petroleum/petrochemicals and by-products of the production process treatment. The non-saleable slops are now rendered an improved quality saleable product with clean cuts. In addition, the aqueous phase created as a consequence of separation has its biological oxygen demand and chemical oxygen demand levels significantly reduced.

Figure 3:
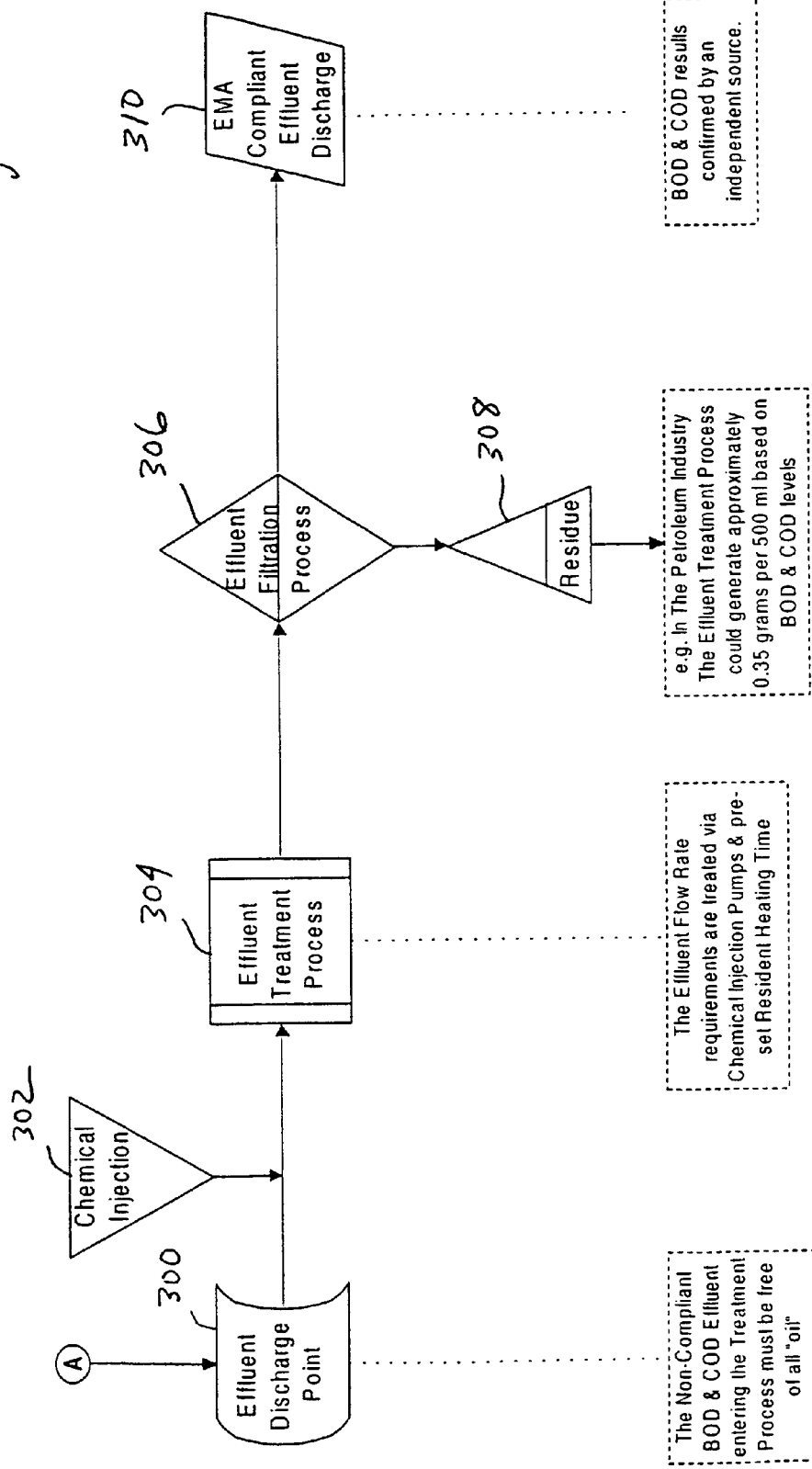
FIG. 3 is a flow diagram of the main stages of the effluent treatment process, in accordance with a preferred embodiment of the instant invention.

FIG. 3 is a flow diagram of the main stages of the effluent treatment process, in accordance with a preferred embodiment of the instant invention. In the first stage 300, the produced/associated non-compliant effluent to be treated is pumped from either the ballast pond area or terminal discharge point to the effluent treatment vessel facility. The effluent to be treated may be the aqueous phase produced by the emulsion treatment process described above and shown in FIG. 1. The effluent may be a combination of various sources of non-compliant effluent. The effluent entering the treatment process must be free of all "Free Oil & Grease." The effluent treatment process creates water effluent with discharge parameter levels compliant with the international environmental effluent standards.

Next, the effluent is tested. Test results of the effluent are analyzed to determine the choice of chemicals and chemical injection system that should be utilized, as well as treatment rates and treatment temperature. In stage 302, the chemical(s) is/(are) injected into the effluent stream based on the required treatment rates and effluent flow rates.

In the next stage 304, the temperature of the effluent is changed. This temperature can be any temperature depending on the particular application in which the invention is utilized. However, an exemplary temperature for embodiments discussed herein may be 30 degrees Celsius. This temperature change renders the dissolved solids insoluble and precipitates the dissolved solids. In other words, this stage converts soluble material to an insoluble state and precipitates the dissolved solids. Achieving the sustained temperature is an integral part of the process. The process has been shown to remove more than 90% of the dissolved and suspended solids in test applications.

In the next stage 306, the precipitated dissolved solids are extracted from the effluent with, for example, a graded bed back-washable filtration system. The amount of dissolved solids precipitated by the effluent treatment process is based on the initial BOD & COD levels. Removal of dissolved solids leaves a residue 308. The residue is then recycled into the environment. The effluent is then rendered a clean effluent 310. The international environmental effluent discharge parameters are monitored and confirmed by either a technician or online instrumentation. The resulting effluent is compliant with all international environmental effluent discharge substance parameters.

Figure 4:
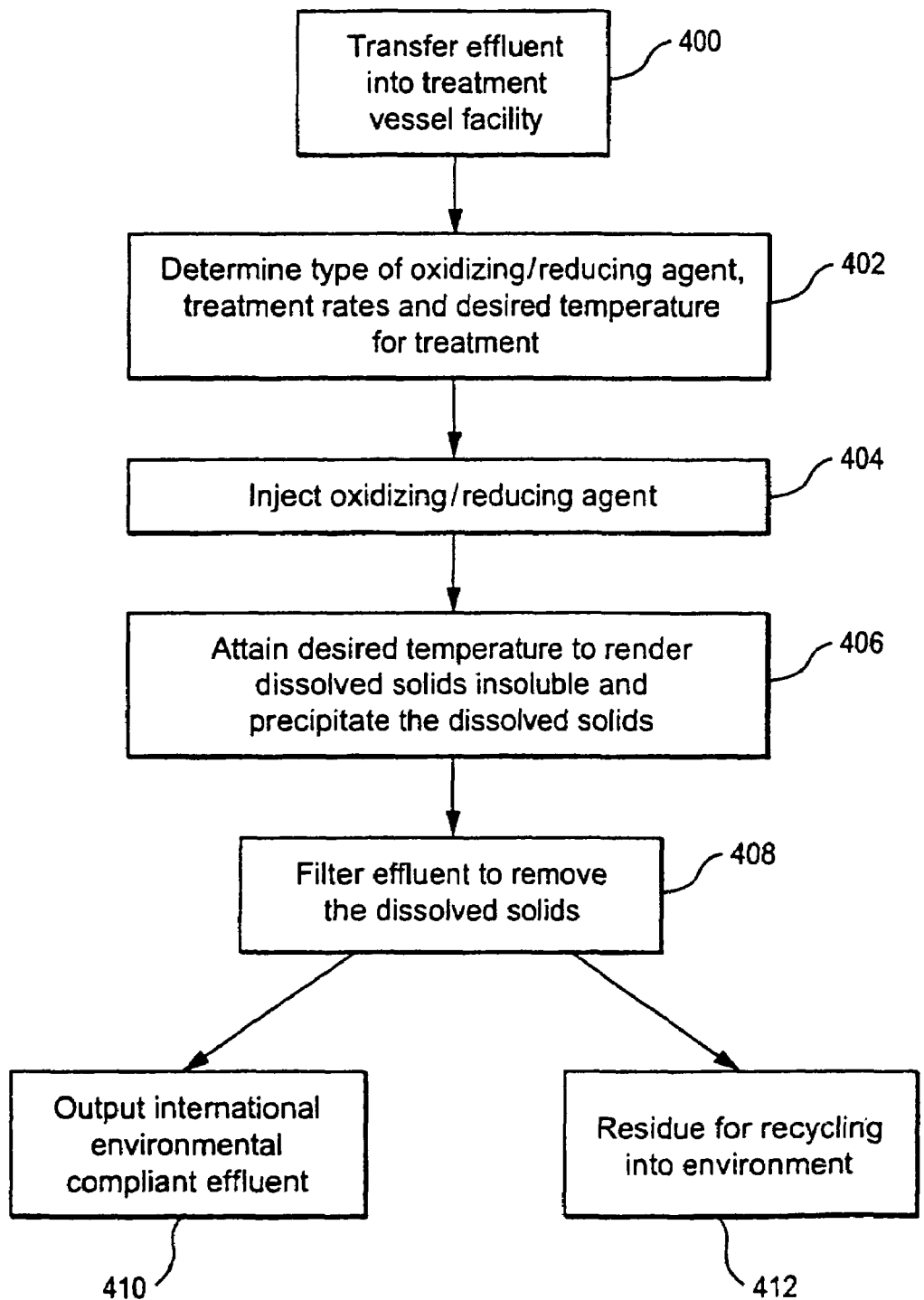
FIG. 4 is a flow chart showing the main steps involved in the effluent treatment process of FIG. 3.

FIG. 4 shows a flow chart of the main steps involved in the effluent treatment process described above in connection with FIG. 3. As described above, the first step 400 involves transferring the effluent to be treated into the treatment vessel facility. In step 402, tests are performed on the effluent to determine the choice of oxidizing/reducing agent to be used for the effluent, as well as treatment rates and treatment temperature. In the next step 404, the oxidizing/reducing agent is injected into the effluent. Then, in step 406, the desired temperature is attained in order to render the dissolved solids insoluble and precipitate the dissolved solids. A filtration process may be used (step 408), in order to remove the dissolved solids. The output effluent 410 is compliant with international environmental effluent discharge parameters. A residue remains that can be recycled into the environment (step 412).

In accordance with the effluent treatment process, the chemical utilized (exemplified by solid/liquid/gas) converts and complexes with the soluble salts (or other dissolved solid) and precipitates them so that the dissolved solids are removed as solids. This is also accomplished through the use of an oxidizing/reducing agent and a change in temperature. Again, the oxidizing/reducing agent is not a de-emulsifier or a surfactant or any combination thereof. The oxidizing/reducing agent may be in the form of a solid, liquid or gas (or combination thereof). The invention is not limited to any specific chemical(s) for the oxidizing/reducing agent. However, the instant inventor has determined that chemicals available from Hydrocarb Trinidad Limited under the tradenames HLC2003, HPC2003, HGC2003 and HSC2003 achieve the desired results when used in accordance with the invention. If the effluent treatment is being performed on the water 112 from the emulsion treatment phase, the same oxidizing/reducing agent may be used in both phases. The oxidizing/reducing agent is designed to grab, react with and precipitate the dissolved solids.

In a preferred embodiment, the effluent treatment process results in the removal of dissolved solids from materials produced as a consequence of the extraction of petroleum/petrochemicals and by-products of the production process treatment. The process uses chemical reaction and/or chained scission in the removal of the dissolved solids. The dissolved solids in the material which were once soluble are rendered insoluble and this non dissolved solid is then removed. The material created as a consequence of the extraction is treated and is able to meet international environmental standards. The residue can then be recycled into the environment thereby closing the environmental loop. The treated effluent can also be released into the environment.

The treated fluids from the aqueous phase complies with the international environmental effluent standards for biological oxygen demand and chemical oxygen demand requirements, in addition to the standard set for dissolved oxygen as well as total petroleum hydrocarbons, total suspended solids, hydrogen ion (pH), sulphide, and the other water pollutant substance parameters, including the International Environmental Effluent Discharge Substance Parameters.

As can be seen from the above description, the instant invention provides an economical and effective process which breaks down and/or separates very tight emulsions, and removes and/or separates dissolved solids from associated effluent produced as a consequence of an industrial process. Chemical reaction and/or chained scission is used in the breaking down and/or separation of the very tight emulsions, and the removal and/or separation of the dissolved solids. The slops which were once non-saleable are now rendered improved quality saleable products with clean interfacial cuts; and the dissolved solids in the effluent which were considered an environmental problem are now rendered compliant with all international environmental standards. After the treatment of the associated effluent, the resulting residue is recycled into the environment thereby closing the environmental loop.

In accordance with an advantageous feature of the instant invention, the emulsion treatment process and the effluent treatment process can be used independently or together depending on the needs of a particular application in which the invention is employed.

While the preferred embodiments of the instant invention have been illustrated and described herein, it will be understood by those skilled in the art that various changes and modifications may be made without departing from the scope of the invention. Thus, the description is meant to be exemplary only and is not intended to limit the scope of the invention beyond the claim language itself.

What is claimed is:

1. A method of treating and breaking down tight emulsions including oil molecules, comprising:
   injecting the emulsion with an oxidizing or reducing agent;
   changing the temperature of the emulsion;
   maintaining the changed temperature for a predetermined period of time, wherein said maintained temperature change, in combination with said injected agent, causes reduced interfacial tension and chained scission of the oil molecules, said chained scission causing the molecular weight of the oil molecules to change and enchancing the final viscosity of a saleable product;
   allowing interfacial separation of the emulsion; and
   outputting a saleable product phase, a solid phase and an aqueous phase, wherein the aqueous phase has a reduction in biological oxygen demand and chemical oxygen demand levels compared to the emulsion,
   wherein the saleable product phase is one hundred percent of the oil molecules, and
   wherein the solid phase is free of one hundred percent of the oil molecules and includes environmently friendly recyclable solids.

2. The method of claim 1, further including testing the emulsion prior to the injection to determine the quantity of the oxidizing or reducing agent, the predetermined treatment time and treatment temperature.

3. The method of claim 1, further including injecting a solubilizer into the emulsion after breakage to enhance the saleable product phase and solid phase.

4. The method of claim 1, wherein the tight emulsion is slops produced during an industrial process, the extraction of petroleum or petrochemicals and by-products of the production process treatment.

5. The method of claim 4, wherein the saleable product phase is oil with increased API gravity over the emulsion and reduction in base sediments and water, the solid phase is sand and/or base sediments, and the aqueous phase is water with reductions in dissolved solids.

6. The method of claim 5, further including recycling the solid phase into the environment.

7. The method of claim 5, wherein the oxidizing or reducing agent is absorbed into the emulsion and strips oil molecules off the sand and water, and further wherein the oxidizing or reducing agent becomes part of the aqueous phase.

8. The method of claim 1, wherein the oxidizing or reducing agent includes hydrophobic chemicals, hydrophilic chemicals or a combination thereof.

9. The method of claim 1, wherein the aqueous phase is further treated using an oxidizing or reducing agent and a temperature change to convert soluble material to an insoluble state and precipitate dissolved solids, and then the dissolved solids are extracted, thereby leaving a residue and a clean effluent.

10. The method of claim 9, wherein the clean effluent is water that complies with international environmental effluent discharge substance parameters.

11. The method of claim 9, wherein the residue is recycled into the environment thereby closing the environmental loop.

* * * * *

UNITED STATES PATENT AND TRADEMARK OFFICE
CERTIFICATE OF CORRECTION

PATENT NO.       : 7,442,311 B2
APPLICATION NO.  : 10/505281
DATED            : October 28, 2008
INVENTOR(S)      : D. Nicholas Page 1 of 1

It is certified that error appears in the above-identified patent and that said Letters Patent is hereby corrected as shown below:

On the title page item (73) (Assignment, page 1), change "(Trinadad)" to "(Trinidad)".

On the title page item (57), line 1 of the Abstract, change "affluent" to "effluent".

Signed and Sealed this

Twenty-fourth Day of February, 2009

JOHN DOLL
*Acting Director of the United States Patent and Trademark Office*